United States Patent [19]

Williams et al.

[11] Patent Number: 5,378,477

[45] Date of Patent: * Jan. 3, 1995

[54] METHOD OF FEEDING A CONSUMPTION MODIFYING SUPPLEMENT TO RUMINANTS

[75] Inventors: Danny L. Williams, Manchester; Dean E. Hodge, St. Louis, both of Mo.; Ted C. Jackson, Jr., Lubbock, Tex.

[73] Assignee: Purina Mills, Inc., St. Louis, Mo.

[ * ] Notice: The portion of the term of this patent subsequent to Dec. 8, 2009 has been disclaimed.

[21] Appl. No.: 984,883

[22] Filed: Dec. 2, 1992

Related U.S. Application Data

[63] Continuation-in-part of Ser. No. 740,337, Aug. 5, 1991, Pat. No. 5,169,656.

[51] Int. Cl.$^6$ .............................................. A23K 1/18
[52] U.S. Cl. ............................................ 426/2; 426/69; 426/623; 426/630; 426/656; 426/658; 426/807
[58] Field of Search ................... 426/2, 69, 623, 630, 426/656, 658, 807

[56] References Cited

U.S. PATENT DOCUMENTS

| | | | |
|---|---|---|---|
| 3,669,676 | 6/1972 | Karr et al. | 99/7 |
| 4,027,043 | 5/1977 | Schroeder et al. | 426/807 |
| 4,112,069 | 9/1978 | Huber | 426/2 |
| 4,118,513 | 10/1978 | Braund et al. | 426/2 |
| 4,172,127 | 10/1979 | Huber et al. | 426/2 |
| 4,186,213 | 1/1980 | Burroughs et al. | 426/2 |
| 4,197,319 | 4/1980 | Betz et al. | 426/2 |
| 4,211,796 | 8/1980 | Lanter et al. | 426/2 |
| 4,225,621 | 9/1980 | Lanter et al. | 426/2 |
| 4,230,736 | 10/1980 | Betz et al. | 426/601 |
| 4,234,604 | 11/1980 | Betz et al. | 426/2 |
| 4,285,974 | 8/1981 | Betz et al. | 426/2 |
| 4,311,713 | 1/1982 | Betz et al. | 426/2 |
| 4,600,585 | 7/1986 | Vitcenda et al. | 426/2 |
| 4,600,586 | 7/1986 | Green | 426/2 |
| 4,818,543 | 4/1989 | Jensen et al. | 426/807 |
| 4,847,095 | 7/1989 | Alley et al. | 426/2 |
| 4,895,728 | 1/1990 | Weakley et al. | 426/2 |
| 4,900,562 | 2/1990 | Miller | 426/2 |
| 5,169,656 | 12/1992 | Williams | 426/807 |

OTHER PUBLICATIONS

Gibson "The effects of feeding Frequency on the growth and efficiency of food utilization of ruminants" Animal Production 1987 vol. 32 (3) pp. 275–283, Dialog Abstract 1393635 from file 53.

Primary Examiner—Helen Pratt
Attorney, Agent, or Firm—Edward H. Renner

[57] ABSTRACT

Ruminant animals, as herbivores, survive and produce while feeding chiefly on grass or other roughage consisting of large amounts of cellulose. Ruminants which have been consuming primarily diets high in cellulose must gradually be adjusted to high grain rations. When the attempt is made to adapt and feed ruminants diets containing no roughage, metabolic problems surface. The increase in lactic acid and accompanying fall in rumen $_pH$ resulting from roughage or cellulose withdrawal leads not only to the destruction of cellulolytic bacteria which digest cellulose), but to the destruction of lactate utilizing organisms, resulting in acidosis and its attendant adverse effects, which results in less than optimal cattle performance. Herein roughage can be eliminated allowing ruminants to consume an all grain, properly balanced diet without these adverse reactions. A roughage free diet for ruminants is provided which alters the eating behavior of cattle. The diet incorporates ingredients which modify feed consumption patterns of cattle consuming a roughage free diet.

8 Claims, No Drawings

METHOD OF FEEDING A CONSUMPTION MODIFYING SUPPLEMENT TO RUMINANTS

This is a continuation-in-part of copending application Ser. No. 07/740,337 filed on Aug. 5, 1991, U.S. Pat. No. 5,169,656.

BACKGROUND OF THE INVENTION

This invention relates to feed composition for ruminants, and particularly to roughage-free diets for such animals.

Ruminant animals are classified as herbivores, meaning they can survive and produce while feeding chiefly on grass or other roughage feed ingredients consisting of large amounts of cellulose. Beef cattle are classified as ruminants. Those maintained for reproductive purposes normally live on ingested forage consisting of large amounts of cellulose and are supplemented with additional protein, energy, minerals and vitamins when nutrients in forages do not meet nutritional needs of the reproducing animals. However, the offspring from these cattle which are being produced for slaughter will normally be placed in a confined feeding facility (feedlot) at 7-15 months of age, and fed growing diets consisting of 30-60% roughage and/or finishing diets consisting of only 5-15% roughage, the roughage will normally be in the form of hay, silage, fodder, corn cobs, cottonseed hulls, etc. The remainder of the diet will consist of a high energy grain source such as corn, grain sorghum, barley, wheat, etc., and properly balanced for protein, minerals and vitamins.

Including 5-15% roughage in the diet of finishing cattle tends to lessen the variation in feed intake, to reduce the amount of feed cattle will normally consume at each feeding, and to increase the number of feedings each day compared to cattle receiving feed containing no roughage. In addition, roughage in high grain diets stimulates the flow of saliva, which helps buffer the acids produced during fermentation, intake and reduces the concentration of energy in the diet. When attempts are made to feed ruminants diets containing no roughage, animal performance is reduced and metabolic problems normally occur. Feed intake of cattle receiving roughage diets becomes very erratic, and the amount of buffering capability through salivation is reduced which leads to rumen malfunction problems. Normally cattle will tend to consume more of the no roughage diet at each feeding and reduce the number of feedings each day. This erratic intake of all grain (no roughage) diets, even though properly balanced for protein and minerals, will result in starch overload. When this occurs, conditions in the rumen favor the proliferation of gram-positive microbes whose end product of fermentation is L- and D-lactic acid. The rumen pH can fall to 4.0, destroying the protozoa, cellulolytic digesting organisms and lactate-utilizing organisms. Other potential problems which can result are bloat, founder, abscessed liver, kidney lesions, rumen parakaratosis, abomasal ulcers and death.

SUMMARY OF THEE INVENTION

We have now found that roughage can be eliminated allowing ruminants free-choice access to an all grain, properly balanced diet without harming rumen digestion and producing the metabolic problems commonly associated with the feeding of non-roughage rations.

A roughage free diet for ruminants is provided herein which alters the eating behavior of cattle. We have now found that by incorporating key ingredients which modify feed consumption patterns of cattle consuming an all grain diet, that cattle will; 1) reduce the amount consumed during their largest daily feeding, 2) increase their number of feedings each day, and 3) increase the uniformity in the size of all feedings. Feeding(s) is defined as the amount or number of times cattle consume feed each day. Altering the eating pattern of no-roughage finishing rations produces a similar feeding situation to a roughage containing ration without producing the negative side effects normally associated with the feeding of all grain (no-roughage rations). Reducing the amount consumed at each feeding helps eliminate grain/starch overload and this reduces the acid buildup in the rumen. Increases in the number of feedings each day result in greater uniformity of feeding size which further reduces grain/starch overload and provides a more uniform microbial population in the rumen with fewer digestive disturbances. This allows cattle to gain weight similar to those on roughage containing rations. However, because feed intake is reduced, cattle are more efficient in converting feed to weight gain. Prior to the discovery herein, there has not been a totally satisfactory solution found, which allows the roughage to be eliminated in feedlot diets.

DETAILED DESCRIPTION OF THE INVENTION

One of the disadvantages of feeding supplements without free-choice, that is intake limiters, to ruminants grazing forages is that the animals tend to over-eat and get a higher intake of feed supplement than necessary, or that can be effectively utilized.

Feed compositions which limit the intake or the amount of supplement consumed on a daily basis by cattle grazing forage are exemplified in U.S. Pat. Nos. 3,669,676, 4,230,736, 4,311,213 and 4,895,728, incorporated herein, as well as others. As described in the prior art the intake limiting feeds can contain ammonium sulfate, fish oil, diammonium phosphate, coconut oil, palm kernel oil, calcium sulfate, salt, calcium chloride, sodium hydroxide, meat meal, chlorinated fat and acidulated fats. They are used for ruminants grazing forages. When the nutrient content of the forages is insufficient to meet the nutrient demand of the animal, supplementation is required.

It is then desirable to limit the intake of the feed supplement so that over consumption does not occur. Incorporating intake limiters into supplements has been used for this purpose. We have now discovered that these feed intake limiting compositions will also modify the consumption patterns of feedlot cattle receiving an all grain ration, and overcome the problems associated with the elimination of roughage from ruminant feeds. This will now be illustrated by means of specific examples.

Procedure A

A group of 32 individually fed beef animals were allotted to each of the treatment groups to equalize weight and genetic potential. The cattle were adapted from a high roughage ration to the high/all grain rations over a 21 day period. Feed was available on an ad libitum basis. Special equipment was developed to measure the amount of diet consumed at each feeding, the number of feedings per day and the time of each feeding. Observations were made for four days on each of the 8 animals per treatment.

EXAMPLE 1

In the first example, cattle were provided a combination of intake modifiers (fish oil, ammonium sulfate, diammonium phosphate) at different levels through a dry protein supplement, which was incorporated into an all concentrate ration to balance protein, vitamin and mineral deficiencies of the grain and molasses mixture. Theses diets were compared to a common roughage containing finishing ration and an all concentrate ration containing no intake modifiers. The diets fed and the level of intake modifiers contained in the diets are shown in Table 1A.

TABLE 1A

| | Diet Composition, % Dry Matter | | | |
|---|---|---|---|---|
| | | All Concentrate | | |
| | Roughage Control | Control | Low Level Modifiers | High Level Modifiers |
| Ingredient | | | | |
| Corn silage | 8.5 | — | — | — |
| Cracked corn | 79.4 | 88.2 | 88.2 | 88.2 |
| Cane molasses | 3.9 | 3.9 | 3.9 | 3.9 |
| Dry supplement | 8.2 | 7.9 | 7.9 | 7.9 |
| Intake Modifiers | | | | |
| Fish oil | — | — | 0.18 | 0.24 |
| Ammonium sulfate | — | — | 0.34 | 0.44 |
| Diammonium phosphate | — | — | 0.20 | 0.26 |

Dry matter intake, number of feedings per day, average size of feedings, largest consumption for individual feedings each day and the time of feeding each day were measured for four consecutive days on each of the 8 animals used on each treatment. The results are shown in Table 1B.

TABLE 1B

| | Treatments | | | |
|---|---|---|---|---|
| | Roughage Control | Control | Low Level Modifiers | High Level Modifiers |
| Dry matter intake, lb | 21.8 | 20.3 | 18.5 | 18.1 |
| Feedings/day, # | 8.0 | 8.0 | 8.9 | 8.7 |
| Avg. lbs/feeding, lb DM | 3.04 | 2.80 | 2.3 | 2.3 |
| Largest feeding, lbs DM | 6.4 | 5.9 | 5.4 | 4.4 |
| Night feedings, # | 0.79 | 0.72 | 1.04 | 1.48 |

Incorporating the intake modifiers in the all concentrate ration resulted in a reduction in dry matter intake, an increased number of feedings/day, a reduction in the average amount consumed at each feeding and a reduction in the largest meal consumed at any one feeding. In addition, the increased number of feedings by each animal resulted in more night feedings during the 8:00 pm –8:00 am time period.

An exact study was conducted to evaluate the effects of incorporating the modifiers in a liquid supplement. The diet fed and the level of modifiers included are shown in Table 1C.

TABLE 1C

| | Diet Composition, % Dry Matter | | | |
|---|---|---|---|---|
| | | All Concentrate | | |
| | Roughage Control | Control | Low Level Modifiers | High Level Modifiers |
| Ingredient | | | | |
| Corn silage | 8.5 | — | — | — |
| Cracked corn | 85.3 | 94.1 | 94.1 | 94.1 |
| Liquid supplement | 6.2 | 5.9 | 5.9 | 5.9 |
| Intake Modifiers | | | | |
| Fish oil | — | — | 0.21 | 0.23 |
| Ammonium sulfate | — | — | 0.39 | 0.42 |
| Diammonium phosphate | — | — | 0.21 | 0.25 |

The results are found in Table 1D.

TABLE 1D

| | Treatments | | | |
|---|---|---|---|---|
| | Roughage Control | Control | Low Level Modifiers | High Level Modifiers |
| Dry matter intake, lb | 21.3 | 21.5 | 19.2 | 18.8 |
| Feedings/day, # | 8.1 | 7.4 | 9.2 | 7.9 |
| Avg. lbs/feeding, lb DM | 2.9 | 2.9 | 2.2 | 2.5 |
| Largest feeding, lbs DM | 5.7 | 6.2 | 4.7 | 4.7 |
| Night feedings, # | 1.19 | 1.29 | 1.69 | 1.56 |

These results are similar to that observed with the dry supplement, indicating that the modifiers are effective in changing eating behavior of all concentrate ration in both forms of supplements.

Further studies have been conducted to determine the effect of individual intake modifiers on consumption patterns. The studies followed the identical procedures outlined in the previously reported trials. The first study was used to identify the effects of varying levels of fish oil, whereas the second study evaluated different levels of ammonium sulfate. The diet composition and modifier levels are shown in Tables 1E and 1F, with the results being shown in Tables 1G and 1H, respectively.

TABLE 1E

| | Diet Composition, % Dry Matter | | | |
|---|---|---|---|---|
| | | All Concentrate | | |
| | Roughage Control | Low Fish Oil Modifier | High fish Oil Modifier | Low Level Modifier |
| Ingredient | | | | |
| Corn silage | 8.5 | — | — | — |
| Cracked corn | 79.4 | 88.2 | 88.2 | 88.2 |
| Cane molasses | 3.9 | 3.9 | 3.9 | 3.9 |
| Dry supplement | 8.2 | 7.9 | 7.9 | 7.9 |
| Intake Modifiers | | | | |
| Fish oil | — | .18 | .24 | .18 |
| Ammonium sulfate | — | — | — | .34 |
| Diammonium phosphate | — | — | — | .20 |

TABLE 1F

| | Diet Composition, % Dry Matter | | | |
|---|---|---|---|---|
| | | All Concentrate | | |
| | Roughage Control | Low Ammonium Sulfate Modifier | High Ammonium Sulfate Modifier | Low Level Modifiers |
| Ingredient | | | | |
| Corn silage | 8.5 | — | — | — |
| Cracked corn | 79.4 | 88.2 | 88.2 | 88.2 |
| Cane molasses | 3.9 | 3.9 | 3.9 | 3.9 |
| Dry supplement | 8.2 | 7.9 | 7.9 | 7.9 |
| Intake Modifiers | | | | |
| Fish oil | — | — | — | .18 |
| Ammonium sulfate | — | .34 | .44 | .34 |
| Diammonium phosphate | — | — | — | .20 |

TABLE 1G

| | Treatment Comparisons | | | |
|---|---|---|---|---|
| | | All Concentrate | | |
| | Roughage Control | Low Fish Oil Modifier | High Fish Oil Modifier | Low Level Modifier |
| Dry matter intake, lb | 22.1 | 21.3 | 20.2 | 19.9 |
| Feedings/day, # | 7.4 | 6.8 | 6.6 | 7.8 |
| Avg. lbs/feeding, lb DM | 3.2 | 3.6 | 3.3 | 2.7 |
| Largest feeding, lbs DM | 6.0 | 6.3 | 6.0 | 5.3 |

TABLE 1H

| | Treatment Comparisons | | | |
|---|---|---|---|---|
| | | All Concentrate | | |
| | Roughage Control | Low Ammonium Sulfate Modifier | High Ammonium Sulfate Modifier | Low Level Modifiers |
| Dry matter intake, lb | 18.6 | 17.2 | 17.8 | 16.4 |
| Feedings/day, # | 7.2 | 10.3 | 9.5 | 8.5 |
| Avg. lbs/feeding, lb DM | 2.7 | 1.8 | 2.1 | 2.1 |
| Largest feeding, lbs DM | 5.5 | 4.3 | 4.7 | 4.1 |

Individually at the levels used, fish oil was not an effective intake modifier compared to the use of a combination of fish oil ammonium sulfate and diammonium phosphate (Table 1G). However, ammonium sulfate at both the low and high levels did modify intake patterns, but possibly not as consistent as that found when the combination was used (Table 1H).

The foregoing data indicates when roughage is replaced with supplements containing intake modifiers such as ammonium sulfate, diammonium phosphate and fish oil, that eating patterns are changed, which precludes the necessity to include roughage in feedlot finishing rations. This was verified in three animal performance trials.

Procedure B

Each of the three studies consisted of 4 treatment groups with 16 head of animals per treatment. The cattle were individually fed and had feed available on an ad libitum basis. Animal weights and feed consumption was determined. The diets and level of modifiers used for the 3 studies are shown in Tables 2A, 2B and 2C. Results are shown in Tables 2D, 2E and 2F.

TABLE 2A

| | Diet Composition, % Dry Matter | | | |
|---|---|---|---|---|
| | | All Concentrate | | |
| | Roughage Control | Control | Low Level Modifiers | High Level Modifiers |
| Ingredient | | | | |
| Cracked corn | 83.3 | 91.6 | 90.3 | 87.0 |
| Corn silage | 8.7 | — | — | — |
| Premix* | — | — | 1.9 | 5.1 |
| Animal fat | — | 0.8 | — | — |
| Dry supplement | 8.0 | 7.6 | 7.8 | 7.9 |
| Intake Modifiers | | | | |
| Fish oil | — | — | 0.2 | 0.5 |
| Ammonium sulfate | — | — | 0.43 | 0.44 |
| Diammonium phosphate | — | — | 0.26 | 0.26 |

*The premix contained 90% cracked corn and 10% fish oil.

TABLE 2B

| | Diet Composition, % Dry Matter | | | |
|---|---|---|---|---|
| | | All concentrate | | |
| | Roughage Control | Control | Low Level Modifiers | High Level Modifiers |
| Ingredient | | | | |
| Cracked corn | 83.3 | 92.5 | 90.7 | 90.7 |
| Corn silage | 8.7 | — | — | — |
| Premix | — | — | 2.0 | 2.0 |
| Animal fat | — | 2.0 | — | — |
| Dry supplement | 8.0 | 7.3 | 7.3 | 7.3 |
| Intake Modifiers | | | | |
| Fish oil | — | — | 0.2 | 0.2 |
| Ammonium sulfate | — | — | 0.40 | 0.40 |
| Diammonium phosphate | — | — | — | 0.24 |

TABLE 2C

| | Diet Composition, % Dry Matter | | | |
|---|---|---|---|---|
| | Dry Supplement | | Liquid Supplement | |
| | Roughage Control | Low Level Intake Modifier | Roughage Control | Low Level Intake Modifier |
| Ingredient | | | | |
| Corn silage | 8.4 | — | 8.5 | — |
| Cracked corn | 79.5 | 88.1 | 85.3 | 94.1 |
| Supplement | 8.2 | 7.9 | 6.2 | 5.9 |
| Cane molasses | 3.9 | 4.0 | — | — |
| Intake Modifiers | | | | |
| Fish oil | — | 0.18 | — | 0.21 |
| Ammonium sulfate | — | 0.34 | — | 0.39 |
| Diammonium phosphate | — | 0.20 | — | 0.21 |

The results from these three performance trials indicate that performance can be enhanced by removing the roughage from feedlot finishing rations, as long as the all grain/concentrate ration contains intake modifiers needed to alter eating behavior.

TABLE 2D

| | Treatment Comparisons | | | |
|---|---|---|---|---|
| | Roughage Control | All Concentrate | | |
| | | Control | Low Level Modifiers | High Level Modifiers |
| Initial weight, lbs | 925 | 975 | 978 | 959 |
| Daily gain, lbs | 2.69 | 2.74 | 2.77 | 2.71 |
| Feed intake/ day, lbs DM | 17.5 | 16.8 | 16.2 | 15.2 |
| Feed required/ CWT gain, lbs | 651 | 613 | 585 | 561 |

TABLE 2E

| | Treatment Comparisons | | | |
|---|---|---|---|---|
| | Roughage Control | All Concentrate | | |
| | | Control | Low Level Modifiers | High Level Modifiers |
| Initial weight, lbs | 914 | 928 | 932 | 932 |
| Daily gain, lbs | 2.98 | 2.98 | 3.11 | 3.04 |
| Feed intake/ day, lbs DM | 21.2 | 18.8 | 18.4 | 17.7 |
| Feed required/ CWT gain, lbs | 740 | 650 | 600 | 590 |

TABLE 2F

| | Treatment Comparisons | | | |
|---|---|---|---|---|
| | Dry Supplement | | Liquid Supplement | |
| | Roughage Control | All Conc. Low Level Modifier | Roughage Control | All Conc. Low Level Modifier |
| Initial weight, lbs | 690 | 697 | 694 | 669 |
| Daily gain, lbs | 3.77 | 3.55 | 3.45 | 3.45 |
| Feed intake/ day, lbs DM | 20.3 | 16.7 | 18.8 | 16.7 |
| Feed required/CWT gain, lbs | 540 | 470 | 560 | 490 |

The results shown in Tables 2D and 2E indicate that when the roughage is removed (all concentrate control), average daily gain is unchanged, feed consumption is reduced and feed efficiency improved. However, when intake modifiers are incorporated into the all concentrate ration, feed intake is reduced further with an improved feed efficiency. Based on the previous eating behavior data, incorporating the intake modifiers increases the number of feedings per day, and reduces the amount consumed at each feeding. This change in eating behavior improves the utilization of the feed grains, which provides for an improvement in feed efficiency, compared to cattle receiving the all concentrate control.

These results also indicate that the level of the intake modifiers can be altered in amount or modifier type and change total dry matter intake. The data in Table 2D indicates that increasing fish oil from 0.2 to 0.5% will reduce daily intake from 16.2 pounds to 15.2. Incorporating 0.24% diammonium phosphate (Table 2E) reduces daily dry matter intake in the modified rations from 18.4 pounds to 17.7.

The data in Table 2F is shown to further verify the reproducibility of the foregoing results. These results indicate that a positive response from the intake modifiers will occur in either a dry or liquid supplement.

The foregoing data show that when roughage is replaced with supplements containing feed intake modifiers such as ammonium sulfate, diammonium phosphate and fish oil (Table 1B), there was an increase in the number of feedings, reduced feeding sizes, and a reduction in the amount consumed during the largest feeding. Moreover, quite unexpectedly, the night meals data indicate that meals were more spread out during each twenty-four hour period. Further medical testing showed fewer metabolic problems such as bloat and acidosis, which is unexpected based on previous research conducted with the feeding of all concentrate rations.

Feed intake modifiers used herein to compensate for lack of roughage, are employed, desirably in a premix, in an amount of 0.2 to 0.5 percent based on the weight of the feed. Usually 0.2 to 0.35 is sufficient to permit roughage to be eliminated from the diet without symptoms normally accompanying roughage withdrawal.

Procedure C

A group of 24 individually fed beef animals were allotted to each of three treatment groups to equalize weight and genetic potential. The cattle were adapted from a high roughage ration to the high/all grain rations over a 21 day period. Feed was available on an ad libitum basis. Special equipment was developed to measure the amount of finishing diet consumed at each feeding and the number of times each animal ate during a twenty four hour period was recorded. From this data, daily intake, number of feedings, average feeding (quantity) and largest feeding (quantity) were computed.

EXAMPLE 3

In the third example, the effect of low and high levels of Coconut and Palm Kernel oils, when incorporated into the all grain cattle finishing diet was evaluated. Specifically, in each of the two trials, two distinct concentrations of either Coconut oil or Palm Kernel oil were administered to the cattle and compared to the results obtained from a group of cattle administered an all grain, control finishing ration. The diets fed and corresponding consumption data are shown below in Tables 3A and 3B.

TABLE 3A

| | Diet Composition, Parts By Weight Dry Matter- All Concentrate | | |
|---|---|---|---|
| Ingredient | Control | Low Level Oil Modifier | High Level Oil Modifier |
| Cracked Corn | 90.0 | 90.0 | 90.0 |
| Dry Supplement | 7.8 | 7.8 | 7.8 |
| Cane Molasses | 2.2 | 2.2 | 2.2 |
| Coconut Oil | — | 0.17 | 0.43 |
| Palm Kernel Oil | — | 0.17 | 0.43 |

Data relating to Dry matter intake, number of feedings per day, average size of feedings and the largest consumption per individual feeding were compiled for four consecutive days on each of the 8 animals used in each of the six treatments. The results are shown in Table 3B below.

TABLE 3B

|  | TREATMENTS | | | | | |
| --- | --- | --- | --- | --- | --- | --- |
|  | Con. 1 Coco. Oil | Low Coco. Oil | High Coco. Oil | Con. 2 Palm K. Oil | Low Palm K. Oil | High Palm K. Oil |
| Dry Matter Intake, lbs. | 21.4 | 21.4 | 19.7 | 22.7 | 21.2 | 20.0 |
| Feedings/day, lbs. | 8.7 | 9.1 | 9.9 | 8.5 | 9.0 | 9.4 |
| Avg. lbs./feeding, lbs. DM | 2.86 | 2.88 | 2.53 | 2.9 | 2.5 | 2.2 |
| Largest feeding, lbs. DM | 6.3 | 9.8 | 4.8 | 5.8 | 5.6 | 5.1 |

As revealed above, the incorporation of an approximate 0.43 wt. % concentration of either Coconut or Palm Kernel oil into the all grain control diet resulted in highly desirable increases in daily feeding frequency, similarly highly desirable decreases in average feed consumption and weight of the single largest feeding together with desirable decreases in total daily feed consumption.

Procedure D

A group of 24 individually fed beef animals were allotted to each of three treatment groups to equalize weight and genetic potential. The cattle were adapted from a high roughage ration to the high/all grain rations over a 21 day period. Feed was available on an ad libitum basis. Special equipment was developed to measure the amount of finishing diet consumed at each feeding and the number of times each animal ate during a twenty four hour period was recorded. From this data, daily intake, number of feedings, average feeding (quantity) and largest feeding (quantity) were computed.

EXAMPLE 4

In the fourth example, the effect of low and high levels of Salt (sodium chloride) and Calcium chloride, when incorporated into the all grain cattle finishing diet constituting the control, was evaluated. Specifically, and as illustrated in Tables 4A and 4B below, each of the feed modifiers was evaluated independently by comparison to the previously described all grain control feed comprised of cracked corn, dry supplement and cane molasses. The diets administered and corresponding consumption data are shown below.

TABLE 4A

|  | Diet Composition, Parts By Weight Dry Matter- All Concentrate | | |
| --- | --- | --- | --- |
| Ingredient | Control | Low Level Modifier | High Level Modifier |
| Cracked Corn | 90.0 | 90.0 | 90.0 |
| Dry Supplement | 7.8 | 7.8 | 7.8 |
| Cane Molasses | 2.2 | 2.2 | 2.2 |
| Salt (Sodium Chloride) | — | 0.76% | 1.52% |
| Calcium Chloride | — | 0.76% | 1.52% |

Data relating to dry matter intake, number of feedings per day, average size of feedings and the largest consumption per individual feeding were compiled for four consecutive days on each of the 8 animals used in each of the six treatments. The results are shown in Table 4B below.

TABLE 4B

|  | TREATMENTS | | | | | |
| --- | --- | --- | --- | --- | --- | --- |
|  | C1 Salt | LL Salt | HL Salt | C2 CC | LL CC | HL CC |
| Dry matter intake, lbs. | 21.6 | 23.4 | 22.8 | 24.6 | 19.1 | 17.0 |
| Feedings/day, lbs. | 7.4 | 8.0 | 8.1 | 7.1 | 6.7 | 6.7 |
| Avg. lbs./Feeding, lbs. DM | 3.1 | 2.9 | 3.0 | 3.7 | 3.2 | 2.7 |
| Largest feeding/ lbs. DM | 6.01 | 6.10 | 6.0 | 7.7 | 6.4 | 5.7 |

At these levels, and to the extent tested, the feed modifiers of Example 4 have not been shown to be effective to modify eating patterns and achieve an effective feeding frequency. As stated earlier, the avoidance of known digestive complications which accompany the transition from high roughage to all grain diets in ruminants is accomplished, largely, by increasing the number of feedings per day while simultaneously decreasing the amount of consumption per individual feeding. As revealed by the data compiled in this study and reported above, applicants have invented a method of feeding cattle an all grain finishing diet whereby daily feted consumption can be reduced to as low as 17.0 lbs., feeding frequency can be increased to about 8 times per day and average feed consumption was observed at a level of about 3 lbs.

Applicants achieved these results in the absence of any evidence of roughage withdrawal consequences to the animals studied.

Having been given the teachings of this invention other advantages and modifications will occur to those working in this field. Thus, by the elimination of roughage from the diets of cattle the quantity of animal waste is reduced making pen cleaning less time consuming. In addition the administration of grains and pellets is more economical than hay. In the case of beef animals it is more desirable to raise the animal so that it eats on a twenty-four hour feeding schedule rather than on one or two feedings per day. Referring now to modifications, the invention herein has been found operable in a wide variety of feeds including corn—dry processed, high moisture and steam flaked, milo—dry rolled, steam flaked and high moisture, wheat—dry rolled, steam flaked, oats—dry rolled, barley—dry rolled, wheat middlings, and corn gluten feed—wet and dry. Such ramifications are within the skill of the art.

While the invention has been described with reference to particular embodiments thereof, it will be apparent to those skilled in the art that various changes and modifications can be made without departing from the spirit of the invention or from the scope of the appended claims.

We claim:

1. A method of feeding protein-based, grain-based, carbohydrate-based and fat-based diets which are devoid of roughage, to a self fed ruminant animal without adverse effects which result from roughage-free diets comprising administering to the animal a roughage-devoid diet to which has been added a consumption pattern modifying supplement selected from the group consisting of coconut oil, palm kernel oil and mixtures thereof, in an amount effective to modify consumption patterns of the animal to overcome problems associated with the elimination of roughage from ruminant diets.

2. The method of claim 1 wherein the feed consumption pattern modifying supplement is coconut oil.

3. The method of claim 1, wherein the feed consumption pattern modifying supplement is palm kernel oil.

4. The method of claim 1, wherein the feed consumption pattern modifying supplement is a mixture of coconut oil and palm kernel oil.

5. The method of claim 1, wherein the weight percentage concentration of the consumption pattern modifying supplement is about 0.10–0.50 weight percent.

6. The method of claim 2, wherein the weight percentage concentration of the coconut oil consumption pattern modifying supplement is about 0.10–0.50 weight percent.

7. The method of claim 3, wherein the weight percentage concentration of the palm kernal oil consumption pattern modifying supplement is about 0.10–0.50 weight percent.

8. The method of claim 4, wherein the weight percentage composition of the coconut oil and palm kernel oil consumption pattern modifying supplement is about 0.10–0.50 weight percent.

* * * * *